Figure 1:
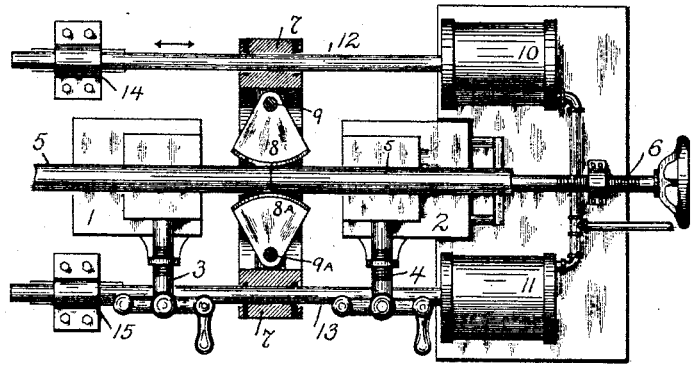

(No Model.)

E. THOMSON.
BURR PREVENTER FOR ELECTRIC WELDING MACHINES.

No. 449,357. Patented Mar. 31, 1891.

WITNESSES
Thos. F. Cowey
Wm. H. Capel

INVENTOR
Elihu Thomson
By H. C. Townsend
Atty.

UNITED STATES PATENT OFFICE.

ELIHU THOMSON, OF SWAMPSCOTT, MASSACHUSETTS, ASSIGNOR TO THE THOMSON ELECTRIC WELDING COMPANY, OF MAINE.

BURR-PREVENTER FOR ELECTRIC-WELDING MACHINES.

SPECIFICATION forming part of Letters Patent No. 449,357, dated March 31, 1891.

Application filed August 15, 1890. Serial No. 362,105. (No model.)

*To all whom it may concern:*

Be it known that I, ELIHU THOMSON, a citizen of the United States, and a resident of Swampscott, in the county of Essex and State of Massachusetts, have invented certain new and useful Burr-Preventers, of which the following is a specification.

My invention relates to an apparatus especially designed for use in reducing or preventing the formation of the burr or enlargement which results in a butt-welding operation from the application of the welding-pressure that tends to squeeze out or upset the heated and softened metal at the point of union, as in the electric-welding operation. The apparatus is, however, applicable to other classes of work, and may be used in confining, reducing, or conforming any upset or enlarged section of heated metal produced by end pressure or otherwise.

My invention consists in the combination, with a machine having means for imparting end pressure to the heated work, so as to tend to upset or enlarge the same, of the metal reducing, compressing, or forming apparatus hereinafter more particularly described, and comprising a number of compressing rockers, segments, or fans adapted to engage simultaneously with the work and pivoted so as to rock or swing individually in planes transverse to the general plane including them, the support or supports for said rockers being adapted to be reciprocated or moved in a direction to cause them to rock together.

The chief utility of the invention is in connection with electric metal-working apparatus, such as electric-welding machines, wherein provision is made for imparting end pressure to the work heated by the electric current.

In practicing the art of electric welding it is generally preferable to hammer, roll, or otherwise work the burr rather than remove it after it is formed, as such operation tends to improve the character and strength of the weld to a great degree. The principal objection to such an operation is the time involved, to avoid which the apparatus hereinafter described is preferably operated so as to treat the burr at the same time that it is formed and not to allow any increase in diameter at the point of union, but to press down the burr as fast as it tends to rise. When employed in connection with an electric-welding machine, the mechanism may be attached to the machine in such way that the removal of the metal operated upon from one machine to another is rendered unnecessary, the whole operation taking place in the one machine.

My invention consists, also, in the combination, with an electric-welding apparatus provided with means for imparting longitudinal pressure to the pieces to be welded, of a number of compressing rockers or segments arranged to engage the work at the weld and surrounding the same so as to practically inclose the whole circumference of the weld, and individually pivoted on a reciprocating support or supports, and each adapted to swing or rock in a line parallel to the line of welding-pressure.

I have herein described my invention as embodied in an organization wherein the compressing segments or rockers are arranged with their working or pressure surfaces assembled in the circumference of a circle for the purpose of operating upon a round bar or rod; but it will be readily understood that the invention is applicable likewise to use in compressing, reducing, or forming metal bars, rods, or pieces wherein the cross-section of the metal operated upon is a square or other figure. In the case of work wherein the sides are flat or straight the number of compressing segments or rockers may be reduced, and in the use of the invention in connection with flat work it may be sometimes found desirable to use but two rockers applied to the flat sides of the work, the edges of the work being left free. I do not therefore limit myself to any particular number of rockers or segments, though in the case of round work it is generally preferable to employ a series of the same, the edges being preferably arranged in such close proximity as to allow little, if any, metal to squeeze out between them. Provision for acting on any such metal escaping beyond the general line of the circumference may be made by properly mounting the apparatus so that it may be given a slight circumferential movement around the work, or the bar or piece of metal operated upon may be rocked on its longitudinal axis.

Figure 2:
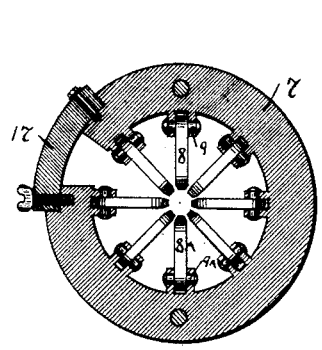
Figure 3:
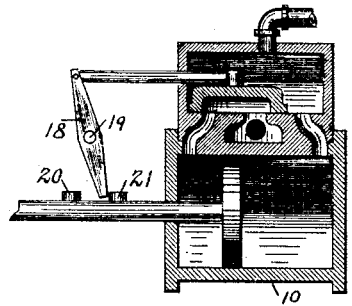

In the accompanying drawings, Figure 1 is a plan of an apparatus embodying my invention, a part being shown in longitudinal section. Fig. 2 is an end elevation of the part carrying the segments or rockers. Fig. 3 is a longitudinal vertical section through a valve movement that may be employed for giving a rapid reciprocatory movement to the part supporting the rockers.

Referring to Fig. 1, the supporting clamps or holders of an electric-welding apparatus are indicated by the numerals 1 2, while two metal bars which are to be welded together, and which are suitably clamped or supported thereby, are indicated by the numeral 5. The means for forcing one clamp or holder toward the other is shown as consisting of a screw 6, which is employed in the electric-welding operation in the well-known manner. The clamps or holders 1 2 are supplied with electric current of suitable volume from any source—as, for instance, from the terminals of the secondary of a converter having an alternating-current primary. A construction of the transformer now commonly employed is described in patent of Hermann Lemp, No. 428,618, dated May 27, 1890.

The numeral 8 indicates a number of compressing segments or rockers arranged in the same general plane around the point of union of the pieces 5 5. A greater or less number of such rockers or segments may be employed, according to the character of the work which it is desired they should do and the form of the metal piece to be operated upon.

The compressing or working faces of the rockers may be varied in shape or form, as desired; but in round work they would preferably be formed, as indicated in the figures, with a slightly-grooved face. A greater or less interval may be left between the edges of the rockers at the point where they engage the work; but preferably they come as close together as practicable, in order to prevent the metal from squeezing between them. Each of the rockers is pivoted upon a suitable frame or support, so that it may swing or turn in a plane transverse to the general plane in which the rockers lie, and each is mounted upon a suitable support adapted to be reciprocated in the general direction of the plane or planes in which the rockers may swing for the purpose of causing the same to rock when moved over the part of the metal to be operated upon, while the same is held stationary. Preferably they are all mounted upon a common support, such as a ring or frame 7, which is carried by rods 12 13, guided at one end in guides 14 15 and attached at the other end to the pistons in cylinders 10 11. The frame might be guided and supported in any other suitable manner to adapt it to be reciprocated backward and forward in a line parallel to the lines in which the rockers may swing.

In order to facilitate the placing of the bar or piece of metal in the work-holding clamps 1 2, the frame 7 is left open at one side. When the work is to be put into place, the segments or rockers contiguous to the opening are swung up to one side to leave a free space, and after the work has reached its position within the space included by the working-faces of the rockers the two rockers referred to are swung down into position. A strap 17 may be used to close the opening and give stiffness when the apparatus is in operation.

The frame or support for the rockers may be reciprocated by any desired mechanism, though I prefer to employ pressure of steam or other fluid acting in the cylinders 10 11. Where a rapid reciprocating motion is desired, a valve movement, such as indicated in Fig. 3, may be employed, the valve being shifted by means of a lever 18, pivoted at 19 and connected with one end of the valve-rod, while its other end is struck alternately by stops 20 21, carried by the piston-rod. Any other means might be employed for reciprocating the frames 7. It will be understood that the parts are suitably mounted upon a table or support. By moving the frame 7 it will be seen that the segments or rockers 8 will be caused to rock upon the section or portion of metal included within their working-surfaces, and that the metal will be thereby compressed or confined to the limits determined by the working-faces of such rockers.

In employing the apparatus in connection with an electric-welding operation it is preferable to reciprocate the frame and rock the segments simultaneously with the application of the pressure for welding, which tends to form the burr or upset the metal at the point between the rockers. The effect of this is to roll down or confine the burr as fast as it tends to rise through the application of the pressure.

In the case of other electric metal-working operations performed by means of the electric metal-working apparatus shown the frame or frames carrying the rockers may be reciprocated during the application of the pressure tending to upset the metal between the clamps or holders in the same manner, or, as will be obvious, the electric metal-working operation performed by the agency of end pressure might be first done and then the segments or rockers which had previously been swung away from position for engagement might be brought down into place and the frame or frames carrying them reciprocated while the metal is hot or while it is reheated by the current. In case the apparatus is used in this manner, one or both ends of the rocker should be formed on a smaller radius than the working part or central portion, or the curved working-surface should, in other words, be made eccentric to the pivotal point, so that when the rockers are swung down to position they may engage properly with the burr or enlargement upon the work.

What I claim as my invention is—

1. The combination, substantially as described, with a metal-working apparatus having means for imparting end pressure to the work, so as to tend to upset or enlarge the same, of a number of compressing-rockers, segments, or fans adapted to engage simultaneously with the piece of metal and pivoted so as to rock or swing individually in planes transverse to the general plane including them, and a support or supports for said rockers adapted to be reciprocated or moved in a direction transverse to said general plane.

2. The combination, substantially as described, with a metal-working apparatus having means for imparting end pressure to the work, so as to tend to upset or enlarge the same, of a series of rockers arranged in the circumference of a circle including the work and a reciprocatory frame or support in which said rockers are pivoted, so that they may rock or swing in individual planes transverse to the general plane including them, as and for the purpose described.

3. The combination, substantially as described, with a metal-working apparatus having means for imparting end pressure to the work, so as to tend to upset or enlarge the same, of a series of compressing or conforming rockers or segments 8, having their compressing or forming surfaces arranged to bear simultaneously upon the work and each adapted to swing in a plane transverse to the common plane in which they lie, and a frame or support 7, carrying said rockers and adapted to be reciprocated, as and for the purpose described.

4. The combination, substantially as described, of an electric metal-working apparatus having means for applying end pressure to the work heated by the current, compressing or forming rockers or segments mounted around the work and swinging on axes transverse to the line of pressure, and a support or supports for said rockers adapted to be reciprocated in a line parallel to the line of pressure.

5. The combination, substantially as described, with a metal-working apparatus having means for imparting end pressure to the work, so as to tend to upset or enlarge the same, of the segments or rockers arranged around the work and adapted to rock or swing in planes transverse to the general plane including them, a support 7, carrying a rocker or rockers, and a cylinder and piston for reciprocating said support in a direction transverse to said general plane, as and for the purpose described.

6. The combination, substantially as described, of an electric metal-working apparatus having means for imparting end movement to the work, compressing or forming segments or rockers arranged around the work and pivoted to swing in planes transverse to the general plane including them, a frame carrying said segments, a piston and cylinder for moving the same in a line parallel to the line of movement imparted to the work, and an automatic valve mechanism connected with said cylinder and piston, as and for the purpose described.

7. The combination, substantially as described, with an electric-welding apparatus having means for imparting welding-pressure to the work, of rockers or segments arranged to engage with the work at the weld and adapted to rock in planes transverse to the general plane including them, a movable support for said rockers, and means for reciprocating the same in a line parallel to the line of welding-pressure.

Signed at Lynn, in the county of Essex and State of Massachusetts, this 11th day of August, A. D. 1890.

ELIHU THOMSON.

Witnesses:
JOHN W. GIBBONEY,
DUGALD MCKILLOP.